United States Patent [19]

Yates

[11] Patent Number: 5,439,258
[45] Date of Patent: Aug. 8, 1995

[54] TUBE COUPLING UNIT

[75] Inventor: Clinton R. Yates, Dayton, Ohio

[73] Assignee: Production Control Units, Inc., Dayton, Ohio

[21] Appl. No.: 107,071

[22] Filed: Aug. 17, 1993

[51] Int. Cl.⁶ ............................................ F16L 37/00
[52] U.S. Cl. ................................... 285/313; 285/315; 285/340
[58] Field of Search ............... 285/313, 315, 316, 340, 285/83–84, 86, 87, 88, 101, 102–105, 312

[56] References Cited

U.S. PATENT DOCUMENTS

| | | | |
|---|---|---|---|
| 3,300,235 | 1/1967 | Blackwell | 285/312 |
| 3,425,717 | 2/1969 | Bruce | |
| 3,434,744 | 3/1969 | Yoke et al. | 285/340 X |
| 3,492,027 | 1/1970 | Herring | 285/315 X |
| 3,510,153 | 5/1970 | Newton | 285/315 X |
| 3,837,687 | 9/1974 | Leonard | 285/315 X |
| 4,884,830 | 8/1989 | Meisinger | |

FOREIGN PATENT DOCUMENTS 2058984  4/1981  United Kingdom ................ 285/315

Primary Examiner—Dave W. Arola
Attorney, Agent, or Firm—Jacox & Meckstroth

[57] ABSTRACT

A tubular metal coupling body defines a chamber which receives an axially movable tubular actuating member defining a bore for receiving an end portion of a metal tube. A counter-bore within the actuating member receives a resilient sealing ring and a compression collar, and a tube gripping spring collet is supported by a retainer confined within a cap threaded onto one end portion of the coupling body. A tubular actuating sleeve surrounds the body and is retained for limited axial movement, and a fitting is threaded into the opposite end portion of the body. A set of circumferentially spaced levers are supported within corresponding slots in the body for pivotal movement in radial directions and move the actuating member axially between released and gripping positions in response to axial movement of a cam surface within the sleeve.

10 Claims, 1 Drawing Sheet

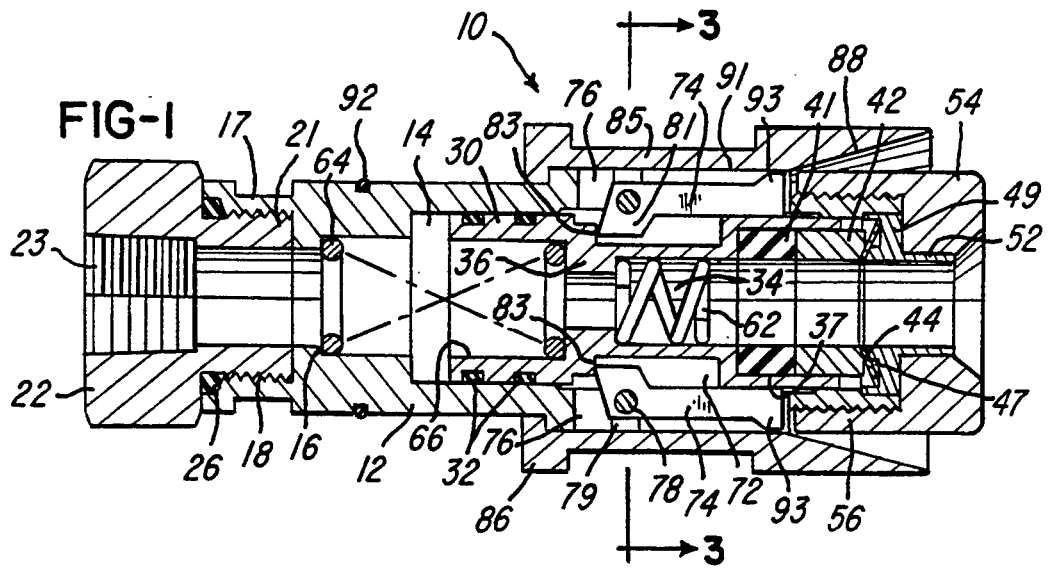
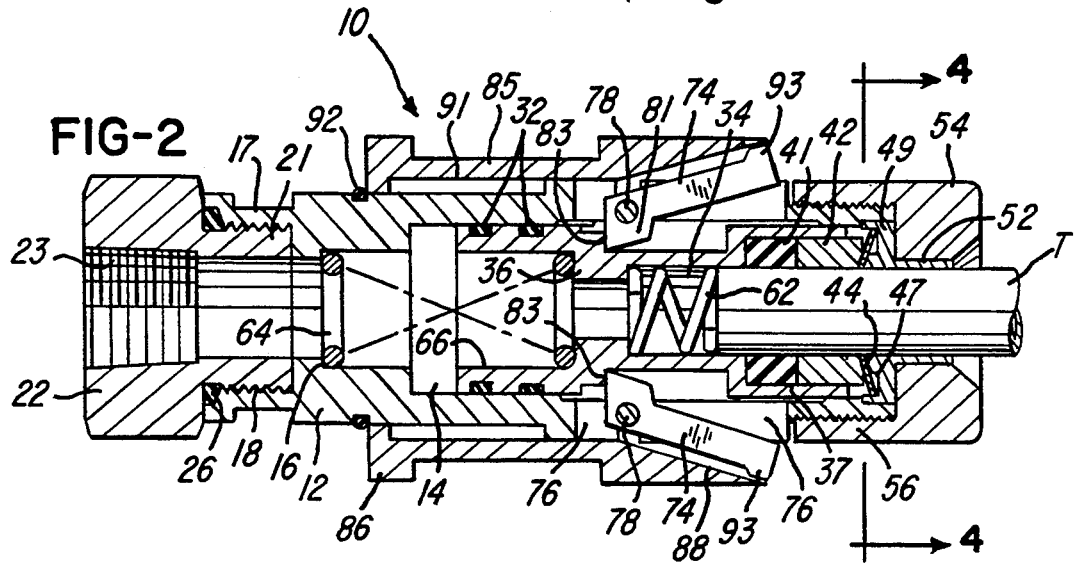
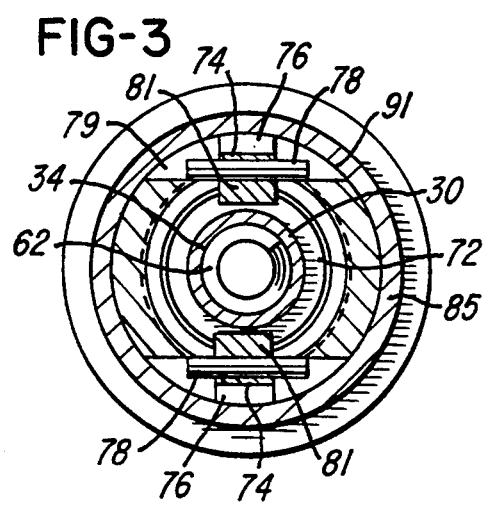
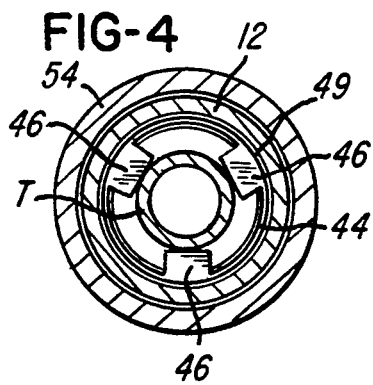

TUBE COUPLING UNIT

BACKGROUND OF THE INVENTION

This invention relates to a tube coupling assembly or unit of the general type disclosed in U.S. Pat. No. 3,425,717 which issued to the assignee of the present invention. In this coupling unit a bail-type actuating member 32 is pivoted on screws 45 for rotating eccentric cams 33 which move an external cap 25 and an internal socket member 18 axially for releasably compressing an annular resilient seal 19 against a tube and for moving a spring collet 21 between a release position (FIG. 1) and a tube gripping position shown in (FIG. 2). Another form of tube coupling device or unit is disclosed in U.S. Pat. No. 4,884,830. In this unit, an outer tubular sleeve 28 moves axially on a tubular coupling body for camming a plurality of balls 24 inwardly to move or cam an internal tubular actuating member from a tube gripping and sealing position, (FIGS. 2 & 3) to a released position (FIG. 1).

It has been found desirable for any such tube coupling device or unit to provide the safety feature of anti-blow-off so that the higher the pressure within the coupling unit, the higher the gripping and sealing force on the tube. It is also desirable for the unit to be constructed for easy operation and convenient replacement of the resilient sealing rings. The coupling unit should also be constructed with a minimum of components which may be easily assembled in order to minimize the construction costs for the unit.

SUMMARY OF THE INVENTION

The present invention is directed to an improved tube coupling unit of the general type described above and which provides all of the desirable features mentioned above. That is, the coupling unit of the invention not only has a simplified construction and is easy to use, but also provides for convenient assembly and disassembly of the unit and for convenient replacement of the resilient sealing ring which engages and seals with the outer surface of the tube. The coupling unit of the invention also provides for tighter gripping and sealing forces on the tube in response to a higher fluid pressure within the unit.

In accordance with one embodiment of the invention, the above advantages and features are generally provided by a coupling unit having a tubular body supporting therein an axially movable tubular actuating member. The actuating member has a counterbore which carries a resilient sealing ring and a compression collar extending from a gripping collet supported by an annular retainer within a cap threaded onto one end portion of the body. An external actuating sleeve is also supported by the body for axial movement and moves a set of actuating levers each supported by a cross shaft or pin for pivotal movement in a radial slot within the body. The levers engage an annular external shoulder on the tubular actuator and move the actuator within the body in response to sliding engagement of the levers with an internal tapered cam surface within one end portion of the actuating sleeve.

Other features and advantages of the invention will be apparent from the following description, the accompanying drawing and the appended claims.

BRIEF DESCRIPTION OF THE DRAWING

FIG. 1 is an axial section of a tube coupling unit constructed in accordance with the invention and showing the unit in a tube released or tube receiving position;

FIG. 2 is an axial section similar to FIG. 1 and showing the position of the coupling unit when it is locked and sealed to the end portion of a tube;

FIG. 3 is a cross section taken generally on the line 3—3 of FIG. 1; and

FIG. 4 is a cross section taken generally on the line 4—4 of FIG. 2.

DESCRIPTION OF THE PREFERRED EMBODIMENT

A tube coupling unit 10 includes a tubular metal body 12 having a stepped internal bore or chamber 14 which extends axially from an inwardly projecting circumferential shoulder 16 to the right end of the body 12 (FIG. 1). The opposite or left end portion 17 of the body 12 has internal threads 18 for receiving a threaded end portion 21 of a hex-head tubular fitting 22 having internal pipe threads 23. A resilient O-ring 26 forms a fluid-tight seal between the fitting 22 and tile left end of body 12, and the fitting 22 is adapted to be connected to a flexible hose for conducting a fluid such as a refrigeration gas.

A tubular actuator 30 is supported within the bore or chamber 14 for axial sliding movement, and a pair of resilient O-rings 32 form fluid-tight seals between the actuator 30 and the tubular body 12. The actuator 30 has an internal chamber or cylindrical bore 34 which extends from an inwardly projecting rib 36 to a counterbore 37 formed within the right end of the actuator 30. A resilient sealing band or ring 41 is confined within the counterbore 37 adjacent a compression collar 42, and the end surface of the compression collar 42 opposes a sheet metal spring collet 44 which includes inwardly projecting and circumferentially spaced tabs or fingers 46, in the same manner as the collet disclosed in above mentioned Pat. No. 3,425,717.

The collet 44 is confined within an annular channel or recess 47 formed within an annular collet retainer 49. The retainer 49 includes a cylindrical hub portion 52 which supports for rotation an annular cap 54 having a skirt portion 56 threaded onto the right end portion of the tubular body 12. As apparent from FIG. 1, the bore 34, sealing ring 41, collar 42, collet 44 and collet retainer 49 have substantially a uniform inner diameter which is normally slightly larger than the outside diameter of a metal tube T (FIG. 2) which is inserted into the bore 34.

A short compression spring 62 is located within the inner end portion of the bore 34 adjacent the rib 36 and is engaged by the inner end of the tube T to prevent damage to the end surface and to permit the tube T to shift slightly within the bore 34 when the tube is gripped by the collet 44. A substantially heavier and longer compression spring 64 extends from the internal shoulder 16 of the body 12 to the rib 36 within the actuator 30 and is partially confined within a cylindrical counterbore 66 within the left end portion of the actuator 30. The spring 64 normally urges the tubular actuator 30 to the right (FIG. 1) for compressing the sealing ring 41 and for deforming the collet 44 towards a less conical position to form a fluid-tight seal between the actuator 30 and the tube T and a positive grip or lock of the tube within the bore 34 by the collet 44, in a manner similar to that disclosed in above mentioned Pat. No. 3,425,717.

An annular external groove or recess 72 is formed within the tubular actuator 30, and a set of two diametrically opposite actuating levers 74 are positioned outboard of the recess 72 within corresponding axially extending slots 76 formed within the tubular body 12. Each of the levers 74 is pivotally supported by a cross shaft or pin 78 (FIG. 3) which extends into aligned slots 79 formed within the body 12 on opposite sides of the slot 76 receiving the lever. Each of the levers 74 also has an end portion 81 which projects into the recess 72 and engages a stepped annular shoulder 83 defining one-side of the groove or recess 72. The levers 74 pivot between a coupling release position (FIG. 1) and a coupling locked position (FIG. 2) and are normally urged outwardly to the locked position by the axial force exerted on the actuator 30 by the compression spring 64.

A tubular actuating sleeve 85 is slidably supported for axial movement by the reduced end portion of the tubular body 12 and is manually movable by a flange 86 between the release position (FIG. 1) and the locked position (FIG. 2). A frusto-conical or tapered annular cam surface 88 is formed within one end portion of the actuating sleeve 85 and extends from a counterbore 91 which receives the larger cylindrical portion of the tubular body 12. A wire retaining ring 92 secures the sleeve 85 on the body 12.

When the coupling is in the released or open position as shown in FIG. 1, the levers 74 have corresponding tip portions 93 which engage the counterbore surface 91 for holding the levers 74 inwardly to compress the tubular actuator 30 axially against the spring 64. After a tube T is inserted into the bore 34 through the retainer 49, collet 44, collar 42, and sealing ring 41 and engages the spring 62, the actuating sleeve 85 is retracted axially towards the fitting 22 (FIG. 2). The levers 74 pivot outwardly with the tip portions 93 sliding along the tapered surface 88. The levers 74 are urged radially outwardly by the axial force on the tubular actuator 30 by the compression spring 64.

As mentioned above, when the tubular actuator 30 moves to the right, the sealing ring 41 is compressed axially so that it forms a fluid-tight seal with the outer surface of the tube T. Also, the inwardly projecting fingers 46 of the collet 44 positively engage the outer surface of the tube T and prevent the tube from being withdrawn or forced out of the bore 34. The spring 62 is compressed slightly by the tube T when the collet 44 grips the tube and the actuator moves to the right. When it is desired to release the coupling unit 10 from the tube T, the sleeve 85 is manually moved to the right (FIG. 1) for camming the levers 74 inwardly into the slots 76 and for shifting the actuator 30 to the left within the bore 14 so that the sealing ring 41 and collet 44 are released from the tube T.

From the drawing and the above description, it is apparent that a tube coupling unit constructed in accordance with the present invention provides desirable features and advantages. For example, the coupling unit 10 is compact and easy to use simply by sliding the sleeve 85 axially on the body 12. The high mechanical advantage obtained by the levers 74 and the cam surface 88 provides for moving the actuator 30 against a substantial force exerted by the spring 64 with a relatively light axial force on the sleeve 85. The coupling unit is also easy to assemble during manufacturing and to disassemble during servicing, for example, in the event that the O-ring seals 32 need to be replaced. When it is desired to replace the sealing band or ring 41, the cap 54 is simply unthreaded from the body 12 so that the collar 42 and sealing ring 41 may be pulled from the counterbore 37. It is also apparent from FIG. 1 that an increasing pressure of the fluid within the tube T and chamber 14 increases the axial force to the right on the tubular actuator 30 and thereby increases the sealing pressure produced by the ring 41 and the gripping pressure produced by the collet 44. This feature assures that the coupling unit does not blow off the tube T in tile event the fluid pressure within the tube and chamber 14 increases or spikes temporarily.

While the form of coupling unit herein described constitutes a preferred embodiment of the invention, it is to be understood that the invention is not limited to this precise form of coupling unit, and that changes may be made therein without departing from the scope and spirit of the invention as defined in the appended claims.

The invention having thus been described, the following is claimed:

1. A tube coupling unit adapted for releasably connecting a flexible conduit to a rigid cylindrical tube having a smooth outer surface, comprising a tubular body defining an internal chamber, a tubular actuating member supported for axial sliding movement within said chamber and defining a bore for receiving the tube, a resilient sealing ring supported within said body for engaging the tube when inserted into said bore, a gripping collet supported within said body for receiving the tube and movable between a tube gripping position and a tube released position, a collet retaining member cooperating with said tubular actuating member to move said collet to said gripping position and to compress said sealing ring against the tube in response to movement of said tubular actuating member axially in one direction, means for moving said tubular actuating member axially within said chamber and including a tubular sleeve surrounding said body and supported by said body for axial movement, at least one actuating lever supported by said body for pivotal movement in a generally radial direction, said lever including means for moving said tubular actuating member in an axial direction in response to generally inward movement of said lever, and said sleeve having means for pivoting said lever in response to axial movement of said sleeve.

2. A coupling unit as defined in claim 1 and including a plurality of said actuating levers spaced circumferentially around said body, and said moving means includes a compression spring within said chamber and positioned to urge said tubular actuating member in said one direction and to urge said actuating levers radially outwardly.

3. A coupling unit as defined in claim 1 wherein said tubular actuating member defines a counterbore, said sealing ring is confined within said counterbore, and a tubular collar is confined within said counterbore and extends between said sealing ring and said collet.

4. A coupling unit as defined in claim 1 and including an annular collet retaining member, and an annular cap member threadably connected to said body and supporting said annular collet retaining member.

5. A coupling unit as defined in claim 1 wherein said sleeve has opposite end portions, and said means on said sleeve for pivoting said lever comprise an internal cam surface within one of said end portions of said sleeve.

6. A tube coupling unit adapted for releasably connecting a flexible conduit to a rigid cylindrical tube having a smooth outer surface, comprising a tubular body defining an internal chamber, a tubular actuating member supported for axial sliding movement within said chamber and defining a bore for receiving the tube, a resilient sealing ring supported within said body for engaging the tube when inserted into said bore, a gripping collet supported within said body for receiving the tube and movable between a tube gripping position and a tube released position, a collet retaining member cooperating with said tubular actuating member to move said collet to said gripping position and to compress said sealing ring against the tube in response to movement of said tubular actuating member axially in one direction, means for moving said tubular actuating member axially within said chamber and including a tubular sleeve surrounding said body and supported by said body for axial movement, said sleeve having an internal cam surface, a plurality of circumferentially spaced actuating levers each supported by said body for pivotal movement in a generally radial direction, means on each said lever positioned to move said tubular actuating member in an axial direction in response to generally inward movement of said lever, and means on each said lever and engaging said internal cam surface on said sleeve for pivoting said lever and moving said tubular actuating member in response to axial movement of said sleeve.

7. A coupling unit as defined in claim 6 wherein said tubular actuating member defines a counterbore, said sealing ring is confined within said counterbore, and a tubular collar is confined within said counterbore and extends between said sealing ring and said collet.

8. A coupling unit as defined in claim 6 wherein said actuating member has a peripherally extending groove, and said means on each said lever positioned to move said actuating member comprise a portion of said lever projecting into said groove.

9. A coupling unit as defined in claim 6 wherein said collet comprises a sheet metal collet, an annular collet retaining member, and an annular cap member threadably connected to said body and supporting said annular retaining member.

10. A tube coupling unit adapted for releasably connecting a flexible conduit to a rigid cylindrical tube having a smooth outer surface, comprising a tubular body defining an internal chamber, a tubular actuating member supported for sliding movement within said chamber and defining a bore for receiving the tube, said tubular actuating member also defining a counterbore, a resilient sealing ring disposed within said counterbore for engaging the tube when inserted into said bore, a gripping collet supported by said body for receiving the tube and movable between a tube gripping position and a tube released position, a tubular collar disposed within said counterbore and extending between said sealing ring and said collet, collet retaining means for moving said collet to said gripping position and for compressing said sealing ring against the tube in response to movement of said tubular actuating member axially in one direction, a tubular sleeve surrounding said body and supported by said body for axial movement, a plurality of circumferentially spaced actuating levers each supported by said body for pivotal movement in a generally radial direction, a compression spring within said chamber and positioned to urge said tubular actuating member in said one direction, means on each said actuating lever for engagement with said tubular actuating member for urging said actuating levers radially outwardly during movement of said tubular actuating member in said one direction, said means on each said lever for moving said tubular actuating member in the opposite axial direction in response to generally inward movement of said lever, and cam means within said sleeve for pivoting said levers inwardly in response to axial movement of said sleeve.

* * * * *